April 6, 1937.  W. R. BLAIR  2,075,797
GYROSCOPIC INDICATING AND CONTROL DEVICE
Filed April 28, 1934  5 Sheets-Sheet 1

INVENTOR
WILLIAM R. BLAIR

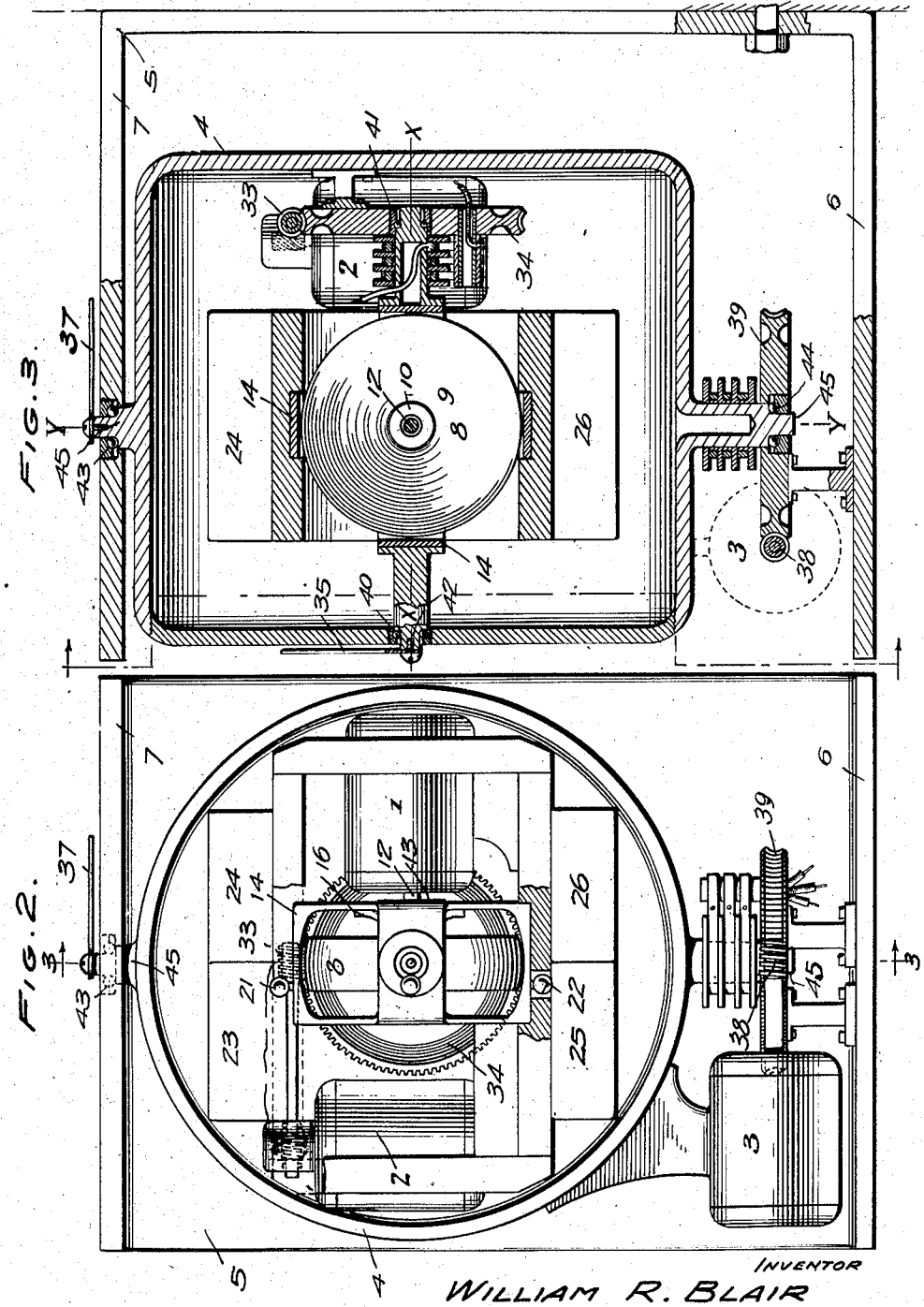

April 6, 1937. W. R. BLAIR 2,075,797
GYROSCOPIC INDICATING AND CONTROL DEVICE
Filed April 28, 1934 5 Sheets-Sheet 3
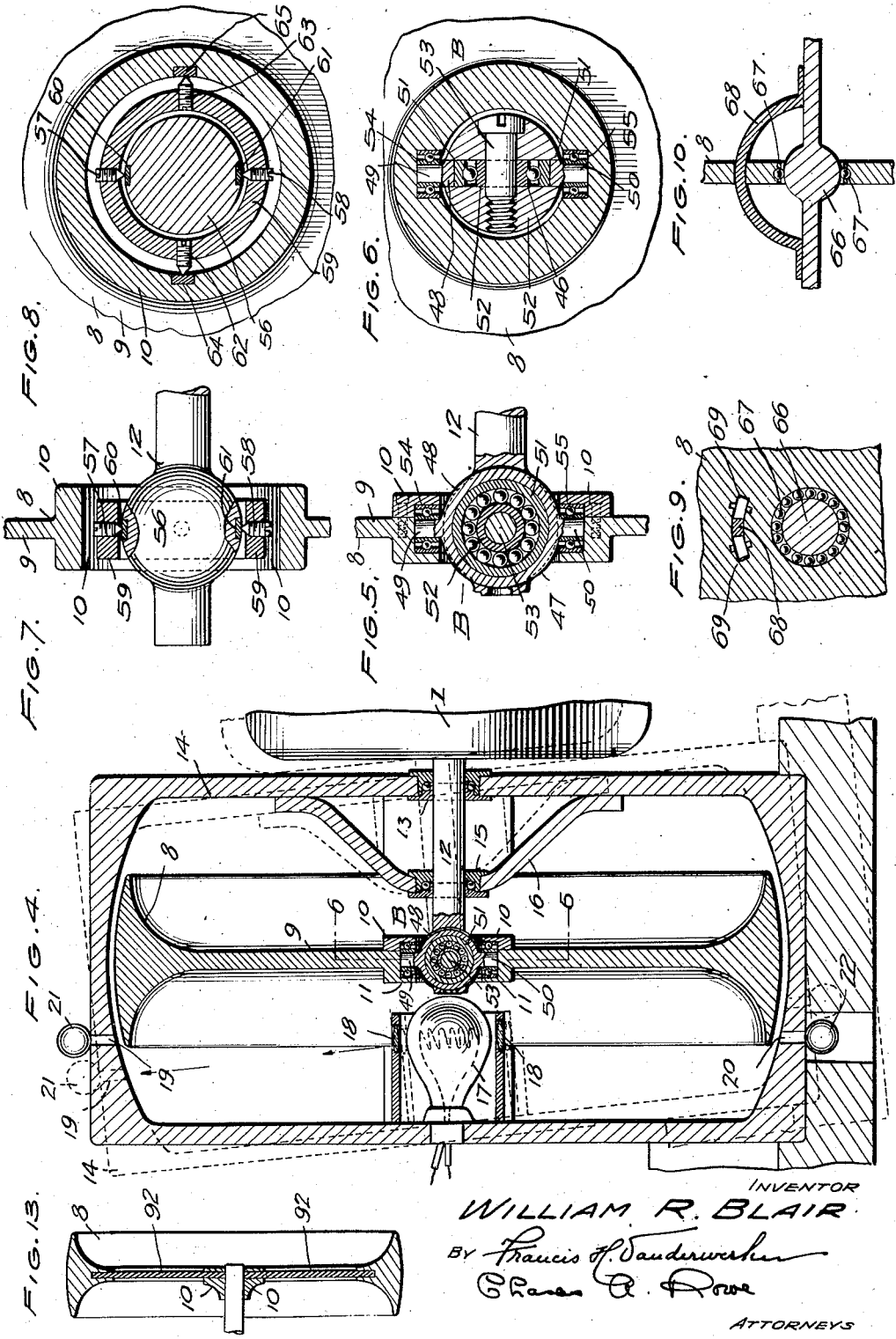

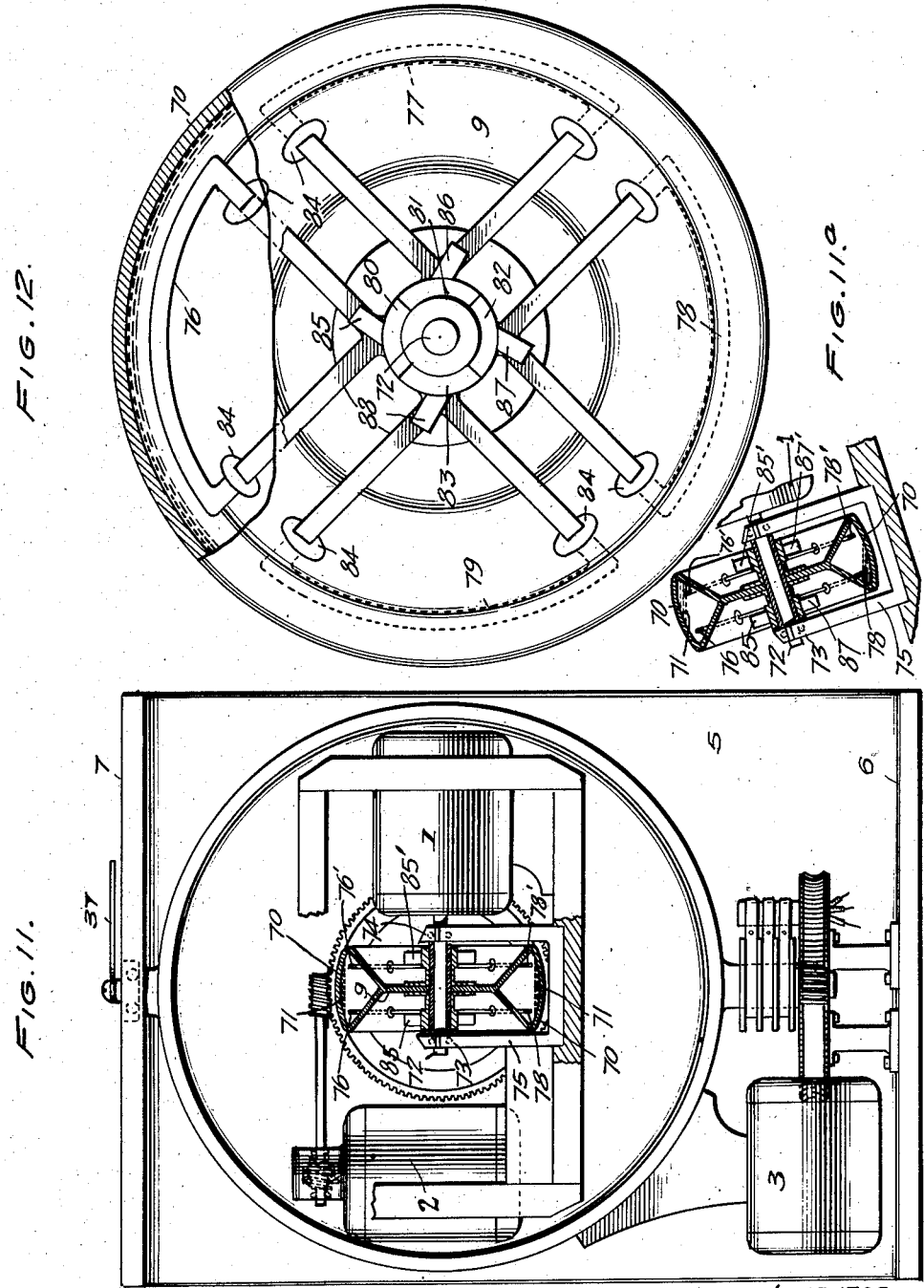

April 6, 1937.  W. R. BLAIR  2,075,797

GYROSCOPIC INDICATING AND CONTROL DEVICE

Filed April 28, 1934  5 Sheets-Sheet 5

INVENTOR
WILLIAM R. BLAIR
BY
ATTORNEYS

Patented Apr. 6, 1937

2,075,797

UNITED STATES PATENT OFFICE 2,075,797

GYROSCOPIC INDICATING AND CONTROL DEVICE

William R. Blair, Fort Monmouth, Oceanport, N. J.

Application April 28, 1934, Serial No. 722,942

15 Claims. (Cl. 33—204)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to direction indicating and control instruments, and proposes a navigational instrument of this character which will operate as a deflection or deviation indicator for dirigible craft in general. A main object is to provide a means of indicating and/or controlling a craft on a predetermined or set course over the earth's surface, in water, or through the air.

An instrument embodying the present invention when used with aircraft has for an important object to establish a fixed reference for maintaining flight attitude, and employs the fundamental gyroscopic principle of fixity of plane of a spinning rotor.

An important object of the invention is to provide an instrument having the essential characteristic that it will continue to indicate the direction in which the needles or pointers of an indicating element are set without regard to the motion of the craft on which it is mounted, and deviations or deflections from a fixed direction may be ascertained from scale readings of the indicating element.

An object of the invention is to provide as an essential component a flexible rotor capable of limited gyrostatic reaction and capable of being spun at a desired rate by a suitable motive means or prime mover.

Another object is to provide an instrument actuated or controlled by such a rotor and embodying means for maintaining the rotor in a set position regardless of the motion of the craft on which the instrument is mounted.

An important object is to provide in such an instrument a type of gyroscopic rotor formed to contain a mobile medium such as mercury, or a liquid medium having similar characteristics, in which said medium is capable of limited gyrostatic reaction when the rotor is spun.

A further object is to produce an instrument comprising means operatively coordinated with such a rotor and capable of functioning both as an indicator and control unit for craft such as aircraft having three degrees of freedom.

Certain preferred embodiments of the invention will now be described with reference to the accompanying drawings, in which:

Fig. 2 is an end elevation;

Fig. 3 is a section taken on the line 3—3 of Fig. 2;

Fig. 4 is a sectional view taken at right angles to the plane of Fig. 3, showing one form of rotor with its ring frame and bearings;

Fig. 5 shows the flexible bearings of Fig. 4, being the same section on an enlarged scale;

Fig. 6 is a section of said bearings taken on the line 6—6 of Fig. 4;

Fig. 7 is a view partly in section of an alternative form of flexible bearing;

Fig. 8 is a sectional view of the bearing of Fig. 7 taken in the longitudinal plane of the rotor;

Fig. 9 is a sectional view of another form of bearing taken in the longitudinal plane of the rotor;

Fig. 10 is a section of the same form shown in Fig. 9 taken transversely of the rotor;

Fig. 11 is an end elevation, partly in section, showing another form of rotor;

Fig. 11a shows the rotor of Fig. 11 and the electrical contact elements in operative position relative to the mercury gyrostat in response to one deviation of the craft;

Fig. 12 is an enlarged projection of the rotor of Fig. 11 and shows a four sector commutator for use with this form of rotor;

Fig. 13 is a transverse section of another form of rotor in which flexible spokes or their equivalents are used to secure flexibility;

Figure 1:
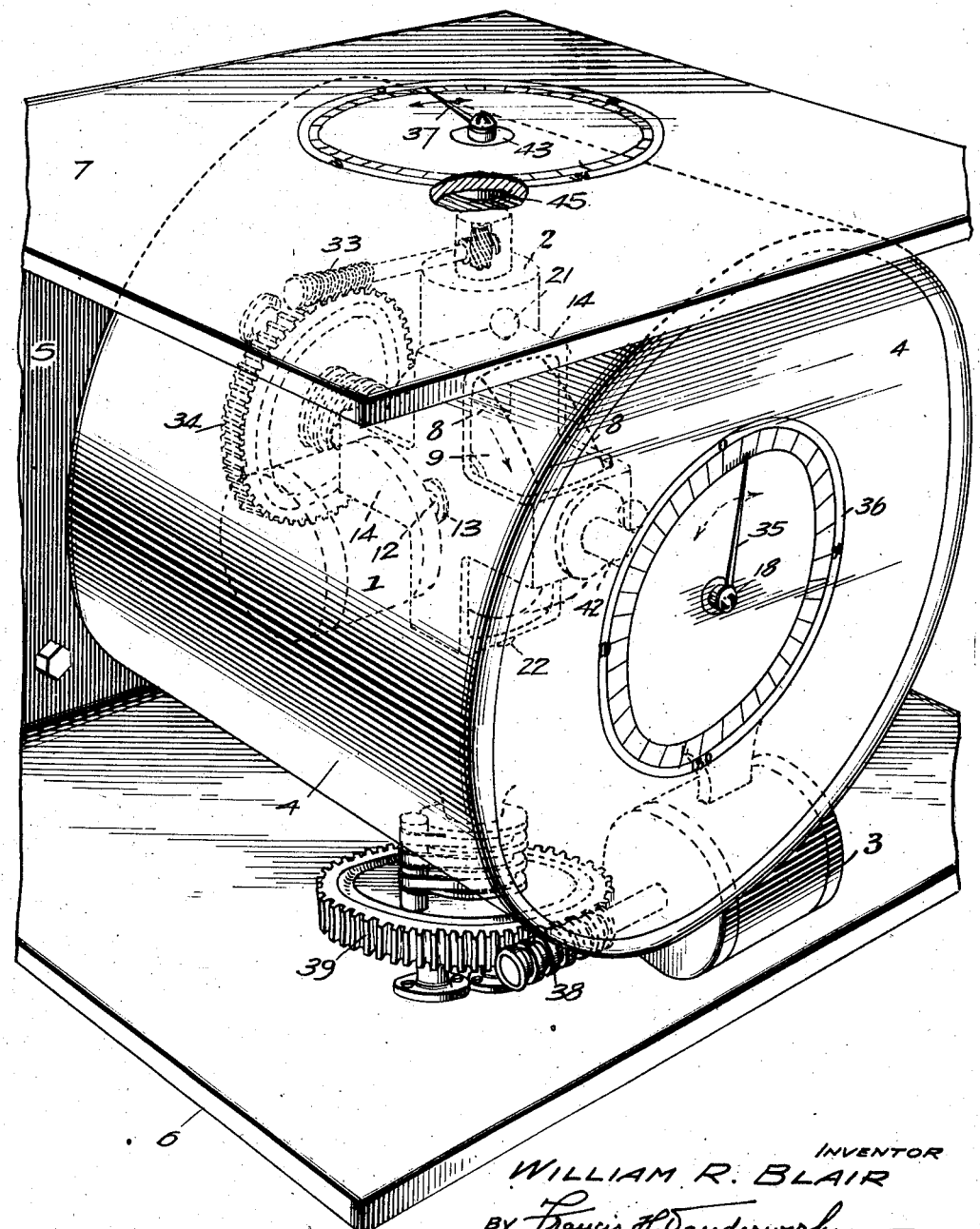
Fig. 1 is an assembly view showing in perspective essential components of an instrument constructed in accordance with the invention.

Considered as a complete unit, the instrument assembly may be visualized by reference to Fig. 1. The gyroscopic structure and associated elements are housed in a casing 4 which is secured to a front plate 5. A base plate 6 is rigidly secured to the front plate and serves to support certain elements of the gearing hereinafter more fully described. It will be understood that the front plate 5, which carries the instrument may be attached in any suitable manner to the craft with which the instrument is used. A top plate 7 is secured to front plate 5. Plates 5, 6 and 7 constitute the main frame structure.

An important feature of the present invention is to overcome precession and other undesirable effects of gyroscopic rotors mounted on gimbals. The invention contemplates a system of mounting and control for gyroscopic rotors whereby the utmost flexibility of the rotor is attained, while at the same time provision is made for positively driving the rotor. In the embodiment shown in Fig. 4, the numeral 8 designates a type of gyrostat or rotor, which comprises the conventional weighted rim portion and a central disk 9 and hub 10. The rotor is substantially balanced about its center of rotation on a special form of flexible bearing structure, generally denoted by the letter B, and shown in detail in Figs. 5 and 6. Elements of the said bearing are secured to hub portions of the rotor as at 11 to provide a positive connection between the shaft 12 and a motor 1 for spinning the rotor in its longitudinal plane. Shaft 12 is journaled in ball bearings 13 in ring frame 14, and in bearings 15 in a bracket 16, secured to said frame, whereby said frame may be free to oscillate about the centrally located flexible bearing B relative to the spinning rotor 8, said rotor maintaining its fixity of plane in accordance with the gyroscopic principle. As will appear from Fig. 4, the shaft 12, carrying motor 1, is adapted to move with the ring frame 14 to take up different positions in response to movements of the craft. It will be understood that the ring frame is mounted to move with the main frame structure, which in turn is rigidly attached to the craft, so that the complete structure, including ring frame 14, follows movements of the craft, whereas the spinning rotor obeys the gyroscopic law of fixity of plane. The main frame structure may be regarded as comprising front plate 5, base plate 6 and top plate 7, all having a fixed relation to the craft.

Figure 14:
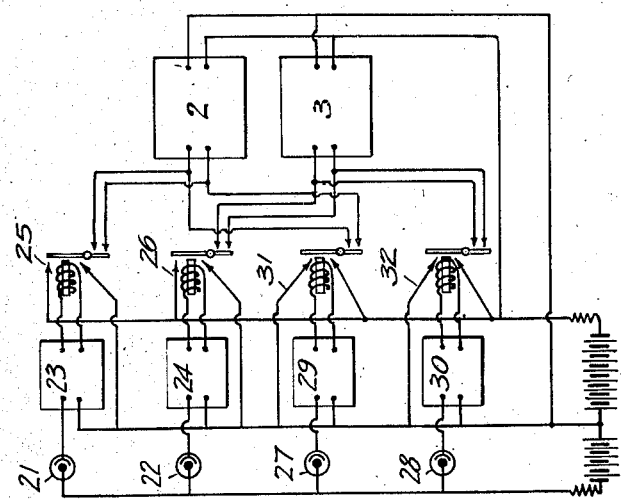
Fig. 14 is a circuit diagram of the system using light sensitive cells as shown in Fig. 4.

A system of control whereby ring frame 14 may be returned to a position normal relative to the plane of the gyroscopic rotor is contemplated by the invention, and its operation will be more fully described later. One method of control uses light sensitive cells in association with a system of relays and motors for restoring the ring frame. As shown in Fig. 4, the ring frame 14 carries a source of light such as lamp 17 whose light is focused through lenses 18 in line with openings formed in the ring frame as at 19 and 20. Light sensitive cells 21 and 22 are located to receive light energy through said openings in a manner hereafter described in detail. The output in electrical energy of said cells is fed to amplifiers 23 and 24 and thence to a pair of relays 25 and 26, which relays control motor 2 (see Figs. 2, 3 and 14). At right angles to this system and employing the same lamp 17, is a similar arrangement comprising a pair of light openings, a pair of light sensitive cells 27 and 28 operative therewith, and a pair of amplifiers 29 and 30, which in turn actuate a pair of relays 31 and 32 for controlling motor 3. The structural arrangement of these parts will be seen in Figs. 1, 2 and 3; and the complete circuit arrangement is shown diagrammatically in Fig. 14.

The operation of this system will now be described. Referring to Fig. 4, assume that motor 1 is spinning the rotor 8 and that the ring frame 14 is rotated in a counter-clockwise direction about the axis X—X (Fig. 3). Obeying the gyroscopic law, the rotor will continue in its original plane thus uncovering the upper opening 19 and permitting light from lamp 17 to strike light sensitive cell 21, which cell acting through amplifier 23 and relay 25 will start motor 2, which operates through worm gear 33 and fixed gear 34 (see Fig. 3) in such a sense as to restore the frame 14 to its original or normal position relative to the rotor 8. Visual indication of the extent of movement of the frame may be determined by means of a dial provided with a scale for reading deviation in terms of degrees. Suitable indicators of this type are shown in Fig. 1. For example, needle 35 will indicate on scale 36 shown on casing 4 the extent of rotation of ring frame 14. In a similar operation the lower opening 20 would be uncovered by a clockwise movement of the frame 14 and motor 2 would rotate in an opposite sense to restore frame 14 to its original position. In this manner, the instrument would indicate the roll of a ship or the bank of an airplane.

For the purpose of indicating changes of direction of the craft, another indicator having its scale located on top plate 7, (see Fig. 1), operates with needle 37. The motor 3 operating with worm gear 38 which meshes with fixed gear 39 controls the indications of said needle in a manner similar to the operation previously described in connection with motor 2. As will be understood by reference to the circuit diagram of Fig. 14, another pair of light sensitive cells 27 and 28 work through amplifiers 29 and 30 to actuate relays 31 and 32, which function with motor 3 similarly to the system working with motor 2.

It will be noted that ring frame 14 is mounted to swing on trunnion bearings as at 40 and 41, and a stub shaft 42 fixed to said frame and journaled in bearing 40 carries needle 35. As previously described, said needle functions with scale 36 to indicate deviations such as the roll of a ship or bank of an airplane. Motor 2 is attached to the frame for movement therewith, and worm gear 33 actuated by said motor is so positioned relative to fixed gear 34 as to permit epicyclic movement of the worm gear about said fixed gear.

Casing 4 is similarly mounted to swing on trunnion bearings 43 and 44, and a stub shaft 45 fixed to said casing and journaled in the upper bearing 43 carries needle 37. As previously explained, said needle functions with its scale to indicate deviations, such as changes of direction or course of the craft with which the instrument is used. Motor 3 is attached to the said casing 4 for movement therewith, and worm gear 38 driven by said motor is so positioned relative to fixed gear 39, with which it meshes, as to permit epicyclic movement about said fixed gear as the motor swings with the casing.

When the instrument is set with the axis of the rotor athwartship, it will function as a bank or roll indicator, as well as a turn indicator. If the axis of the rotor be set at 90° to this position, but still normal to the longitudinal axis of the craft, the instrument acts as a clinometer as well as a turn indicator, provided always that axis Y—Y (see Fig. 3) is vertical or approximately so. Therefore, while the instrument may be employed to indicate up to 360° on either dial, in practice, if a pilot desired to change his course by, say 10°, at a given point, he would make the change as indicated on the dial and then reset the instrument bringing the axis of the rotor back to athwartship, or to right angles to this position if desired. Means, not shown, for resetting the instrument quickly and conveniently while under way is provided by suitably exerting slight pressure on the flexible rotor.

If the instrument is set with the axis of the rotor in the vertical position, it functions both as a bank or roll indicator and as a clinometer. While the term "indicator" has been previously used, it will be understood that this instrument may be employed to control as well as to indicate. This control may be exercised either directly by the pilot on the craft, or remotely in accordance with methods already developed. When employed as a control unit, the instrument, as herein disclosed, controls the operation of motors sufficiently powerful to actuate the steering apparatus such as rudders, ailerons, fins or the like with which a craft may be equipped. For example, a slight modification would permit motors 2 and 3 to perform the desired function of operating directly upon the steering devices of the craft instead of operating upon fixed gears such as gears 34 and 39 hereinbefore described.

Craft moving with two degrees of freedom require one instrument only to indicate or to control their direction of motion. Craft moving with three degrees of freedom require two instruments for complete indication or control of their position relative to the three axes upon which they may turn.

Flexibility of the rotor for the purposes of the present invention may be accomplished by means of a special bearing structure, several forms of which are herein disclosed. Referring to Figs. 4, 5 and 6, the form of bearing there shown comprises a body portion generally spherical and integral with shaft 12. Body portion 46 is centrally and transversely cut away to receive a centrally located roller bearing 47 comprising an annular member 48, said member being provided at diametrically opposite points with a pair of stub shafts 49 and 50. Located within the annular member 48, an outer ring 51 and an inner ring 52 are disposed in spaced relation to form a raceway for balls as shown, the inner ring being freely rotatable on the balls as a bearing. This central roller bearing is held in place by a screw 53 which passes through body portion 46 and through inner ring 52, as shown in Fig. 6. A pair of ball bearings 54 and 55 are mounted on stub shafts 49 and 50, and are seated in hub members 10—10 of the rotor for the purpose of driving the rotor. As will be understood by reference to Figs. 4 and 5, the driving impulse is imparted from motor 1 through shaft 12 and bearings 54 and 55 to spin the rotor. Thus, the drive of said rotor is positive, while at the same time providing freedom of movement in planes other than the longitudinal plane of the rotor by means of the central roller bearing 47 and the pair of roller bearings 54 and 55.

Other forms of flexible bearings have functioned successfully and two of such forms are illustrated in Figs. 7 and 8, also Figs. 9 and 10. The bearing structure shown in Figs. 7 and 8 is a point bearing comprising a central generally spherical body portion 56 integral with the shaft 12. Tapered screws 57 and 58 are threaded in annular block 59 which is seated in the hub portion 10—10 of the rotor. The tapered points of said screws are seated in cups such as jewel cups 60 and 61 to form point bearings to permit freedom of movement about a vertical axis while permitting a positive drive of the rotor in its longitudinal plane. At right angles to said point bearings (see Fig. 8) similar point bearings are provided by tapered screws 62 and 63 seated in jewel cups or the like as at 64 and 65 attached to the hub of the rotor. As before stated, this form of bearing also makes possible positive drive of the rotor and permits freedom of movement in planes other than the longitudinal plane of the rotor.

Still another form of bearing is shown in Figs. 9 and 10. As will be seen by reference to Fig. 9, the generally spherical portion 66 integral with the shaft is journaled in ball bearings 67. Secured to the shaft is an arcuate bracket member 68 working in roller bearings 69 in the rotor disk 9, which makes it possible to positively drive the rotor while at the same time movement of the arcuate bracket in the roller bearings on the one hand, and the movement made possible on the other hand by the ball bearings 67 permit freedom of movement in the same way as the other forms.

Another form of gyroscopic rotor is shown in Figs. 11 and 12. The rim 70 of said rotor is hollow forming a circular cavity or reservoir to contain a mobile conducting medium such as mercury, designated by the numeral 71. It is understood that any conducting medium having the characteristic of mobility might be used, mercury being merely one medium well adapted for the purpose. When the rotor is spun by motor 1 the mobile body of mercury acts as a gyrostat. As will be understood, a hollow sphere, or section thereof, and containing such a mobile body, would act as such a rotor. A central disk 9 carries the rim section, and the rotor is mounted on a shaft 72 journaled in suitable ball bearings 73 and 74 in frame 75. Motor 1 functions to drive or spin the rotor as in other forms of the invention. It will be understood that the motor 1 is adapted to move with the frame structure responsive to movements of the craft with which the instrument is used. As in other forms a motor 2 is provided, together with suitable gearing, for controlling the operation of restoring the frame to normal in one plane, while a motor 3 functions for a similar purpose in another plane. Indicators and indicator needles are provided as in other forms, one of the indicator needles being shown in Fig. 11 as at 37. A series of insulating contacts is arranged around the rotor and disposed interiorly of the hollow rim in sets of four on each side of said rotor. Referring to Fig. 12, the contacts of one group are denoted by numerals 76, 77, 78 and 79, and each is in operative electrical connection with the sectors 80, 81, 82 and 83 of a four sector commutator. The radial arms of the contacts pass through insulating collars inserted in the hollow rim of the rotor, these collars being denoted by the numeral 84. Brushes function with the commutator and it will be noted that a set of four brushes is provided on each side of the rotor. The brushes of one set denoted by the numerals 85, 86, 87 and 88 are shown in Fig. 12.

It will be understood as stated above that another set of four contacts are located on the opposite side of the rotor and these are designated by numerals prime to those above described. Another set of brushes designated by numerals prime to those above described will also be required on the other side of the rotor. Two oppositely disposed pairs of said contacts 76, 76', also 78, 78' and brushes 85, 85' also 87, 87' may be seen by reference to Fig. 11 and Fig. 11a.

Figure 15:
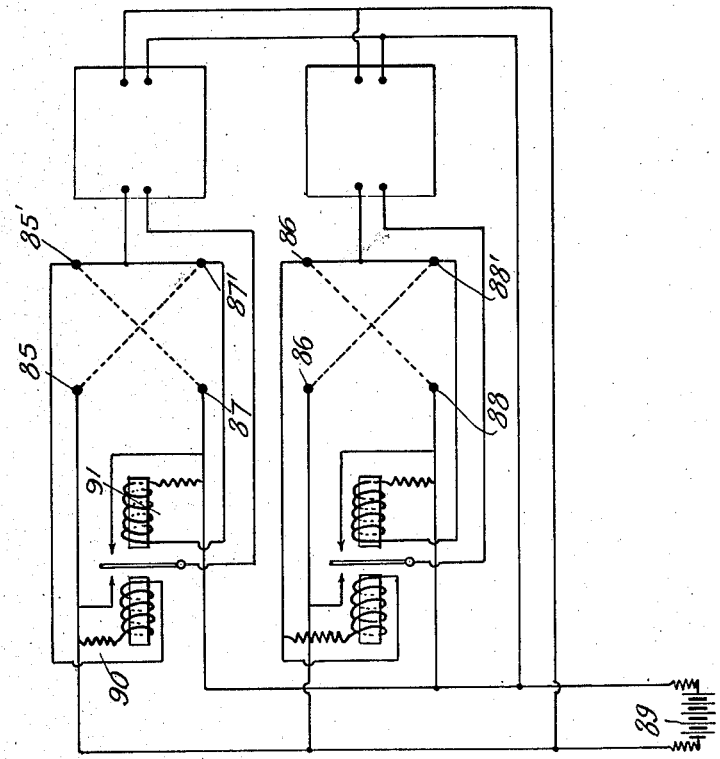
Fig. 15 is a circuit diagram of the system used with the type of rotor shown in Fig. 11.

Reference is now made to the circuit diagram of Fig. 15, which shows the electrical system operative with this form of mercury gyrostat. It will be understood from this diagram that a pair of relays operates with each of the restoring motors 2 and 3. Assume that motor 1 is spinning the rotor of Fig. 11, the instrument being so mounted that the axis of the rotor is athwartship. Assuming a counter-clockwise movement of the frame structure in response to roll or bank of the craft, (see Fig. 11a), the mercury gyrostat obeys the gyroscopic law maintaining its position and level as indicated by dotted line position, while the hollow rim section of the rotor follows the oscillating movement of the supporting frame whereby contacts 76' and 78, located respectively on opposite sides of the rotor are brought into electrical contact with the body of mercury. Thus, as may be deduced from Figs. 11 and 11a and circuit diagram of Fig. 15, current from source 89 flowing from one electrode and lead to brush 85', through contact 76', mercury 71, contacts 78, brush 87, relay 90 and through motor 2 back to source, would control the motion of motor 2 in one direction to restore the complete frame structure to a positon normal to the plane occupied by the mercury gyrostat. Assuming a clock-wise movement of the frame structure in response to a roll or bank of the craft, contacts 76 and 78' located respectively on opposite sides of the rotor would be brought into electrical contact with the body of mercury. Oppositely directed current would then flow from source 89 to brush 85, contact 76, mercury 71, contact 78', brush 87', relay 91 and through motor 2 back to source, and would control the motor in an opposite direction to restore the frame structure to normal. As in other forms, the extent of deviation would be read from the indicators. Similarly motor 3 would be controlled by cooperating brushes and associated contacts on opposite sides of the rotors, as may be deduced in the same manner from Figs. 11 and 11a and circuit diagram of Fig. 15.

Flexibility of the rotor may be accomplished in other ways as for example by employing elastic material either in the form of a disk or diaphragm, or in the form of spokes, to connect the hub and rim of the rotor. Such a modification is shown in Fig. 13 in which a flexible disk or diaphragm 92 connects rim 8 and hub 10 of the rotor.

The invention has been described in connection with certain preferred embodiments, but it is understood that changes and modifications are contemplated within the scope of the appended claims.

I claim:

1. In an instrument for use with dirigible craft, a gyroscopic rotor; a drive shaft for said rotor, the rotor and shaft being coupled by a universal joint whereby the axes of rotor and shaft may move angularly with respect to each other; means for spinning the shaft; a main frame structure fixed to the craft to move therewith; means carried by said frame structure for mounting the drive shaft for universal movement with respect thereto; means responsive to angular movement of the mounting means from predetermined position with respect to the rotor for moving said means to restore said predetermined position; and index means controlled by angular movements of said mounting means with respect to the main frame to indicate angular movements of the craft.

2. In an instrument for use with dirigible craft, a gyro rotor; a drive shaft for said rotor; means for driving the shaft to spin the rotor; bearings mounting the rotor on said shaft for angular movement about any axis normal to said shaft; and power means controlled by relative tilting movement of the rotor and shaft, to move said shaft to restore its axis to a position normal to the plane of the rotor.

3. An indicating and control instrument for dirigible craft, comprising a gyroscopic rotor; means comprising a drive shaft for spinning the rotor, and including bearings for coupling the said shaft and rotor to permit angular movements of their axes with respect to each other; a main frame fixed to the craft to move therewith; means carried by said main frame, including a ring frame, for mounting the drive shaft for universal movement with respect to said main frame; means responsive to deviations of said ring frame with respect to said rotor to restore the ring frame to its predetermined position; and index means controlled by the deviations of said ring frame with respect to the main frame to indicate angular movements of the craft.

4. An indicating and control instrument for dirigible craft, comprising a gyroscopic rotor; means for spinning the rotor, including a drive shaft therefor, and universal bearings for coupling the rotor to its drive shaft to permit angular movements between their axes; a main frame fixed to the craft for movement therewith; means for supporting the drive shaft for universal movement relative to the main frame, said means including a ring frame moving with said shaft; power means controlled by relative tilting movements of said rotor and said shaft to restore the ring frame to a position normal to the plane of rotation of said rotor; and index means responding to deviations of said ring frame with respect to the main frame to give coincident, quantitative indications of angular movements of the craft.

5. An indicating instrument for dirigible craft comprising a gyroscopic rotor; means comprising a drive shaft for spinning the rotor, and including bearings for coupling the said shaft and rotor to permit angular movements of their axes with respect to each other; a main frame fixed to the craft to move therewith; supporting means operatively coordinated with the main frame, and including a ring frame, for mounting the drive shaft for movement with respect to said main frame about two mutually normal axes at right angles to the drive shaft; power means acting in response to deviations of the ring frame with respect to said rotor, but without deriving energy from the rotor, to restore the ring frame to its normal position relative to the rotor; and index means controlled by the deviations of said ring frame with respect to the main frame to indicate angular movements of the craft.

6. In an instrument for use with a dirigible craft, a gyroscopic rotor; means for spinning the rotor and including a drive shaft therefor; means for mounting the rotor on said shaft, including a flexible portion of elastic material for coupling the rotor to its shaft to permit angular movement of the rotor about any axis normal to said shaft; and power means controlled by relative deviations of rotor and shaft to move said shaft to restore its axis to a position normal to the rotational plane of the rotor.

7. In an instrument for use with dirigible craft, a gyro rotor; a drive shaft for the rotor; means for driving the said shaft to spin the rotor; flexible means formed of elastic material for coupling the rotor to its shaft to permit angular movements of their axes with respect to each other; and power means acting under control of relative deviations of rotor and shaft to restore the axes of said shaft to a position normal to the rotational plane of the rotor.

8. An indicating instrument for dirigible craft comprising a gyroscopic rotor; means comprising a drive shaft for spinning the rotor; means comprising elastic material for coupling the said shaft and rotor to permit universal movement of their axes with respect to each other; a main frame fixed to the craft to move therewith; a supporting structure operatively coordinated with the main frame, and including a ring frame, for mounting the drive shaft for movement with respect to said main frame about two mutually normal axes at right angles to the drive shaft; power means acting in response to deviations of the ring frame with respect to said rotor to restore the ring frame to a normal position relative to the rotational plane of the rotor; and index means controlled by deviations of said ring frame relative to the main frame to indicate angular movements of the craft.

9. In an instrument for use with dirigible craft, a gyroscopic rotor; means for spinning the rotor, including a drive shaft therefor; means including elastic material functioning as a universal coupling between rotor and shaft to permit angular movements of the axis of said shaft in relation to the plane of rotation of the spinning rotor; a main frame fixed to the craft for movement therewith; a ring frame and means for mounting the same on the drive shaft to permit movement of the ring frame relative to the main frame about two mutually normal axes at right angles to the drive shaft; power means controlled by deviations of the ring frame with respect to the rotor to restore the ring frame to normal position relative to the rotational plane of said rotor; and index means responding to relative movements between the ring frame and main frame to indicate angular movements of the craft.

10. In an instrument for use with dirigible craft, a hollow gyroscopic rotor; a mobile electrically conductive medium carried within the rotor having a gyrostatic action independently of the rotor when said rotor is spun; a drive shaft for said rotor; and means responsive to movements of the rotor and said medium to move the axis of rotation of said drive shaft and rotor to a position normal to the gyrostatic plane of rotation of said medium.

11. An instrument of the character described for use with dirigible craft comprising a drive shaft carrying in fixed relation thereto a circular hollow rotor, said rotor carrying therein an electrically conducting fluid capable of limited independent mobile action about any one axis at right angles to the drive shaft of the rotor, said fluid lying in the median plane of said rotor and having two degrees of freedom with reference to the drive shaft when the latter is spun; a frame structure attached to the craft and moving with it; means mounting the rotor and drive shaft for movement about two mutually normal axes at right angles to said shaft; and means employing the electric conductivity of the fluid but deriving no energy from said fluid, said means being responsive to turning movements, however large, of the frame structure to rotate said mounting means about said axes to maintain the drive shaft of the rotor normal to the plane of rotation of the fluid.

12. An indicating instrument for dirigible craft comprising a gyroscope, including a hollow rotor, said rotor being provided with a drive shaft in fixed relation thereto; an electrically conductive mobile medium carried by the rotor and capable of gyrostatic action independently of said rotor when spun; a frame structure fixed to the craft and moving with it; means mounting the rotor and drive shaft for movement about two mutually normal axes at right angles to said shaft; an index on the frame structure; means for operating the drive shaft to spin the rotor; and means electrically operative with said medium and controlled thereby in response to turning movements of the frame structure to rotate said mounting means about said axes to maintain the drive shaft of the rotor normal to the plane of rotation of said medium whereby the index is coincidentally actuated to indicate turning movements of the craft irrespective of their amplitude.

13. In an instrument for use with dirigible craft, comprising a gyroscopic structure, including a hollow rotor adapted to contain a mobile electrically conductive medium capable of gyrostatic action independently of the said rotor when spun; means for spinning the rotor and including a drive shaft therefor; and power means responsive to relative tilting movements of the rotor with respect to said medium, and controlled by the latter to restore the axis of the drive shaft to a position normal to the gyrostatic plane of rotation of said medium.

14. In an instrument for use with dirigible craft, a gyroscopic rotor having a rim section formed as a reservoir; a drive shaft for the rotor; a mobile electrically conductive medium in said reservoir capable of independent gyrostatic action when said rotor is spun; means for driving the shaft to spin the rotor and said medium contained therein; a main frame structure fixed to the craft to move therewith; means for mounting the drive shaft for universal orientation with respect to the said frame structure; power means responsive to angular movements of the mounting means from predetermined position with respect to the said medium for restoring said means to said predetermined position; and index means responsive to angular movements of said main frame structure and controlled by tilting movements of said rotor with respect to said medium to indicate corresponding deviations of the craft.

15. In an instrument for use with dirigible craft, a gyroscopic structure including a rotary body having a hollow rim portion adapted to contain a mobile electrically conductive medium capable of action as a gyro rotor independently of the body when said body is spun; a drive shaft for the body; means for driving the shaft to spin the body and the medium contained therein; mounting means for the gyroscopic structure; a main frame fixed to the craft and operatively coordinated with said mounting means; power means responsive to tilting movements of said body from predetermined position relative to said medium to restore said body to predetermined position; and index means responsive to angular movements of said main frame and controlled by tilting movements of said body with respect to said medium to indicate corresponding deviations of the craft.

WILLIAM R. BLAIR.